United States Patent
Schütze

[11] Patent Number: 5,944,441
[45] Date of Patent: Aug. 31, 1999

[54] CONNECTION BETWEEN RODS OR TUBES MADE OF FIBRE COMPOSITE MATERIALS

[75] Inventor: Rainer Schütze, Braunschweig, Germany

[73] Assignee: Deutsch Forschungsanstalt fur Luft- und Raumfahrt e.V., Bonn, Germany

[21] Appl. No.: 08/825,203

[22] Filed: Mar. 27, 1997

[30] Foreign Application Priority Data

Mar. 27, 1996 [DE] Germany ............... 196 12 248

[51] Int. Cl.⁶ ................................. B25G 3/36
[52] U.S. Cl. ............... 403/403; 403/217; 52/653.2; 52/309.2; 52/309.4
[58] Field of Search ............... 403/403, 170, 403/217, 187, 188; 52/653.2, 309.2, 309.4, 651.09, 721; 135/127

[56] References Cited

U.S. PATENT DOCUMENTS

| | | | |
|---|---|---|---|
| 1,719,440 | 7/1929 | Nathan | 403/217 X |
| 4,648,734 | 3/1987 | Daus, Jr. et al. | 403/170 |
| 4,758,458 | 7/1988 | Schutze . | |
| 5,357,729 | 10/1994 | Schutze . | |
| 5,484,634 | 1/1996 | Schutze | 52/653.2 X |
| 5,542,230 | 8/1996 | Schutze . | |
| 5,586,423 | 12/1996 | Mullen | 52/653.2 X |
| 5,640,811 | 6/1997 | Boyle et al. | 403/170 X |

FOREIGN PATENT DOCUMENTS

| | | |
|---|---|---|
| 24 117 | of 1959 | German Dem. Rep. . |
| 34 00 043 A1 | of 1984 | Germany . |
| 42 05 834 C1 | 6/1993 | Germany . |
| 43 30 857 C2 | of 1994 | Germany . |

OTHER PUBLICATIONS

Patent Abstracts of Japan, 6–257607(A)—Dec. 14, 1994, vol. 18/No. 660.

*Primary Examiner*—Brian K. Green
*Assistant Examiner*—William L. Miller
*Attorney, Agent, or Firm*—Salter & Michaelson

[57] ABSTRACT

In a connection between round composite fiber rods or pipes positioned at an angle to one another there are provided angular connecting elements of which the angle corresponds to the angle between the rods to be connected, fiber helical windings in the region of the vertices of the angular connecting elements, respective arms of the connecting elements being arranged to be inserted in the rod or pipe ends. The angular connecting elements are fastened positively on a rod and/or rest frictionally in the rod ends. The fiber helical windings wrap around the angular connecting elements in their angled portions and connect them to one another. Fillers and/or adhesives fill the cavities which are formed at the rod or pipe ends.

5 Claims, 4 Drawing Sheets

CONNECTION BETWEEN RODS OR TUBES MADE OF FIBRE COMPOSITE MATERIALS

BACKGROUND OF THE INVENTION

The invention relates to a connection between rods or pipes of composite fibre materials, in particular a connection between round composite fibre rods or pipes or tubes positioned at an angle to one another. It also relates to angular connecting elements and fittings for such a connection of rods or pipes.

For frameworks, in particular three-dimensional frameworks, in which a plurality of rods, for example transverse and/or diagonal rods are to be attached to a continuous beam at a junction, German Patent Document DE 43 30 857 C2 discloses a connecting element consisting of composite carbon fibre material with intersecting fibres for an adhesive connection, which are provided with a curved portion which is designed as a pipe shell for resting on a continuous rod and from whose exterior there radially projects at least one junction plate which is integral with the pipe shell, can be connected to the rods to be attached and extends with respect to the pipe shell in a plane containing the axis thereof, the junction plate being formed from at least two layers of a fibre fabric of which the fibres intersect at an angle of ±45° to the pipe shell axis. The rods to be attached are split at their attachment ends so they can be pushed onto the junction plate and can be connected to the junction plate by adhesion. To obtain a continuous thrust-resistant wall over the entire adhesive face, i.e. lateral face, of the split, corresponding inserts are provided in the rod ends.

A connection of this type provides a convenient method of producing framework structures, in particular three-dimensional framework structures. Under extreme loads, however, the connection between the rod ends and the junction plates, in particular, can be endangered.

It is known from German Patent Document DE 34 00 043 A1 to provide a connecting element with a leaf-shaped core, against which a fibre fabric tube rests. The fabric tube is protected against constriction in width by the leaf-shaped core, for example a stiff sheet of paper. The core has a unidirectional laid member on its underside. The core is provided with a core reinforcement consisting of a foam opposite the unidirectional laid member. The core reinforcement has the form of a triangle. With one side of the triangle, it adjoins a longitudinal edge of the leaf-shaped core and it is bevelled toward the leaf-shaped core on the other two edges. The connecting element is stuck to rods which it is to bind, using adhesive. Two connecting elements are preferably provided in the case of more markedly stressed connections, the second connecting element then being applied from the opposite side. In some applications, the connecting element is produced from sheet metal.

It is known from Japanese Patent Document JP 6-257607 A to connect two rods using T-shaped shell elements. The elements are worked from metal. Rod and T-shaped shell elements as metal connecting element are connected to one another by bolts.

A connection between rods of frameworks in lightweight construction, preferably aircraft construction, by adhesion is known from former East German Patent Document DD-PS 24 117. The abutting ends of rods are connected by means of wound bushings which taper from the centres of impact and consist of glass cloth strips impregnated with curable adhesive resin.

SUMMARY OF THE INVENTION

The invention seeks to provide a connection which allows the absorption of great forces and, for example in the case of rods which are to be connected by their ends in a junction, allows a connection which can be formed without external projections and attachments, particularly if the rods are arranged with axes which intersect in a plane or in three dimensions.

According to a first aspect, the present invention provides a connection arrangement comprising round composite fibre rods or pipes to be connected and positioned at an angle to one another, angular connecting elements with an angled portion having an angle corresponding to the angle between said rods or pipes to be connected, fibre helical windings in the angled portion of said angular connecting elements, the rods or pipes having ends and cavities being formed at said rod or pipe ends and fillers and/or adhesives are provided for filling said cavities, respective arms of said connecting elements being inserted in said ends, wherein said angular connecting elements are fastened on a respective rod or pipe by positive contact and/or are supported in said rod or pipe ends by frictional contact and wherein said fibre helical windings are wrapped around and interconnect said angular connecting elements in said angled portions.

According to a second aspect, the present invention provides an angular connecting element for a rod connection comprising an angular fitting with arms positioned at an angle to one another, unidirectional fibres distributed over the periphery of said fitting and wrapped round an angled portion of said fitting by a high-strength peripheral winding made, in particular, of composite carbon fibre material, wherein said fitting is arranged to be adhered into rod ends.

According to a third aspect, the present invention provides An angular fitting for a connection between rods comprising an internal angular connecting element and an external angular connecting element positively surrounding a rod, said elements having arms, said arms being connected to one another in an angled portion thereof by helical windings and wherein said internal angular connecting element rests on said rod in a portion between its angled portions.

BRIEF DESCRIPTION OF THE DRAWINGS

The invention is illustrated by way of example in the drawings and is described in detail hereinafter with reference to the drawings.

DESCRIPTION OF THE PREFERRED EMBODIMENTS

Figure 1:
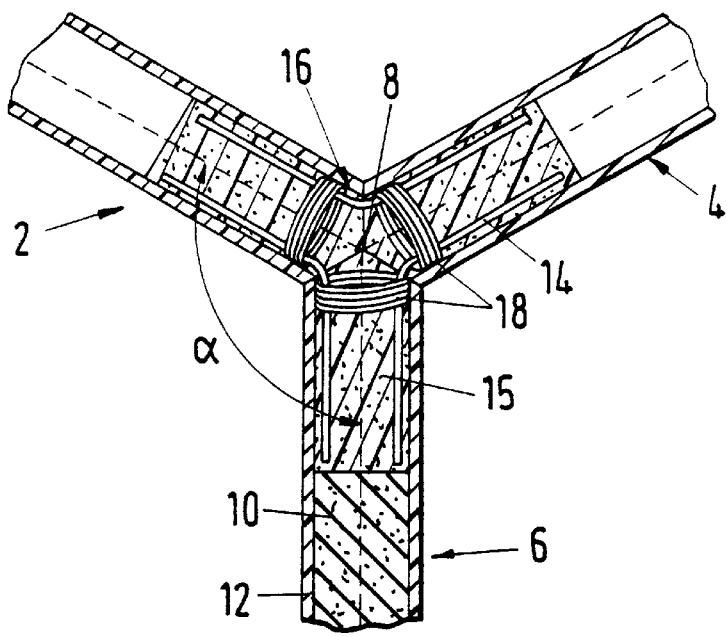
FIG. 1 is a plane axial section through a connection consisting of three rods with axes intersecting at the junction.

Basically, the present invention provides angular connecting elements of which the angle corresponds to the angle between the rods to be connected, fibre helical windings in the vertex region of the angular connecting elements, fillers and/or adhesives for filling the cavities formed at the rod ends, into which a respective arm of the connecting elements is inserted, wherein the angular connecting elements are fastened on a rod by positive contact and/or are supported in the rod ends by frictional contact and wherein the fibre helical windings loop and interconnect the angular connecting elements in their vertex region.

This creates a connection between rods or pipes of composite fibre material which is particularly advantageously of very low weight. Furthermore, particularly great strength is achieved owing to the provision of positive connection on a continuous rod. The production costs for creating the connection are relatively low but allow high flexibility with respect to the attachment of several transverse and diagonal rods on a continuous rod or boom.

The angular connecting elements are particularly preferably pre-assembled as a fitting to be inserted into the rod ends.

A connection for the attachment of at least one straight rod to a straight continuous rod, for example a boom, in which the angular connecting elements project at the end of the rod to be attached with one arm beyond the rod end in the structural plane is also preferred. This is achieved in that they lie parallel to the continuous rod. These arms are stuck to the continuous rod and are also held by a helical winding embedded in a resin matrix. Internal angular connecting elements are particularly preferably arranged as connecting elements in adjoining rods to be attached in this embodiment if there are at least two rods to be attached. Their vertices are at a distance from the wall of the continuous rod and are connected to the arm of the connecting elements engaging in the rods to be attached by a helical winding in the vertex region. They rest with their other arm against the surface of the continuous rod.

It is particularly preferable to provide an angular connecting element for rods which has an angular fitting with arms positioned at an angle to one another and unidirectional fibres distributed over the periphery of the fitting. The unidirectional fibres are looped in the vertex region of the fitting by a high-strength peripheral winding, in particular of composite carbon fibre material, the fitting being stuck into the rod ends. Therein, the foam core is cleared out, for example according to the arm length of the fitting, if a thin-walled composite fibre material rod is used as rod. However, pultruded pipes, for example, with advantageously inserted ribs into which the fitting is stuck can also be used.

A fitting for the rod which is to be attached and is bevelled at an angle corresponding to the attachment angle at the attachment end of the rod is particularly preferably provided in a connection for the attachment of at least one rod to a straight continuous rod. Unidirectional fibres are distributed over the periphery of the fitting, are bent in the direction of the continuous pipe in the region of the bevel and are shaped to a trough corresponding to the external diameter of the continuous rod. The trough is bent transversely to the continuous rod over a range $\leq 180°$. The unidirectional fibres are looped in the cylindrical region with a helical winding made of high-strength fibres, in particular of composite carbon fibre material. The fitting is stuck into the end of the rod to be attached. The rod to be attached preferably rests with its trough positively on the continuous rod or boom and is stuck to this rod. A winding embedded in a synthetic resin matrix is provided round the trough in the region of the trough and the continuous rod.

In a further embodiment there are preferably provided an internal angular connecting element and an external angular connecting element which positively surrounds a rod, the arms of the connecting elements being connected to one another by helical windings in the region of the vertices of the connecting elements, and the internal angular connecting element resting on the rod in a portion between its vertices.

An angle of 60° is particularly preferably provided between the arms of the internal angular connecting element in the case of triangular truss beams. An angle of 90° is preferably provided for rectangular truss beams. An angle of 45° is preferably provided between the arms of internal and external angular connecting element connected to one another by the helical winding and the looped rod or boom, in order to achieve torsional rigidity. The fitting preferably consists of unidirectional fibres with or without a carbon fibre fabric tube.

For the attachment of at least two rods to a straight continuous rod or a boom, there is particularly preferably provided the angular fitting which positively surrounds the continuous rod, is stuck with its arms frictionally in cavities in the ends of the rods or pipes to be attached and by sleeve elements which are applied or stuck onto the continuous rod in addition to the fitting so as to prevent axial displacement of the fitting. The sleeve elements are preferably provided as split sleeve elements with a film hinge made, in particular, of glass fibres. They are lifted up, provided with adhesive and then applied and stuck to the continuous rod in addition to the fitting. The adhesive is therefore reproducibly provided at a defined point on the continuous rod.

A rigid connection between connecting piece or fitting and boom is produced by positively looping the continuous rod or boom without damaging it in any way.

The sub-claims relate to advantageous embodiments, in particular embodiments of the attachment of transverse and diagonal rods to a continuous rod.

Referring now to the drawings, FIG. 1 shows a connection between three rods 2, 4, 6 of which the axes shown in broken lines intersect at a point 8. The rods 2, 4, 6, like the rods in all embodiments to be discussed hereinafter, are round composite fibre rods or pipes and a 10 having a foam core wall 12 can have a layer of unidirectional longitudinal fibres extending parallel to the axis and a fabric tube lying thereon, the longitudinal fibres and the fabric tube consisting of a high-strength material, preferably carbon. Rods of this type are known.

Angular connecting elements 14 of which the angle corresponds to the angle α between the axes of the rods are provided for connecting the three rods. The angular connecting elements 14 consist of unidirectional fibres which extend in the longitudinal direction of the angular connecting elements and are embedded in a synthetic resin matrix. Angular connecting elements in which the unidirectional fibres are enclosed in a fabric tube with intersecting fibres are preferably used. The prefabricated angular connecting elements with cured resin matrix are connected to one another in the region of the vertices 16 via helical windings 18 of high-strength fibres. Corresponding three-armed fittings with corresponding spacer elements are preferably provided as connecting pieces, at least for the region of intersection including the region with the helical windings 18, and the entire connecting piece can optionally also be prefabricated with the three angular connecting elements and the three helical windings to simplify, for example, assembly of the angular connecting elements and the helical windings and handling during assembly. The core should then consist of a pressure-resistant material to avoid pressing in the arms of the angular connecting elements under load.

The rods are mitre-cut at the junction symmetrically to their axes so a continuous surface is obtained after insertion of the connecting piece.

The cavity provided inside the wall 12 is filled with a synthetic resin matrix 15 after insertion of the angular connecting elements. However, it can also initially be filled with synthetic resin matrix and the arms of the connecting elements only then be inserted to prevent inclusion of air.

Helical windings can optionally also be applied externally to the rod ends.

Figure 2:
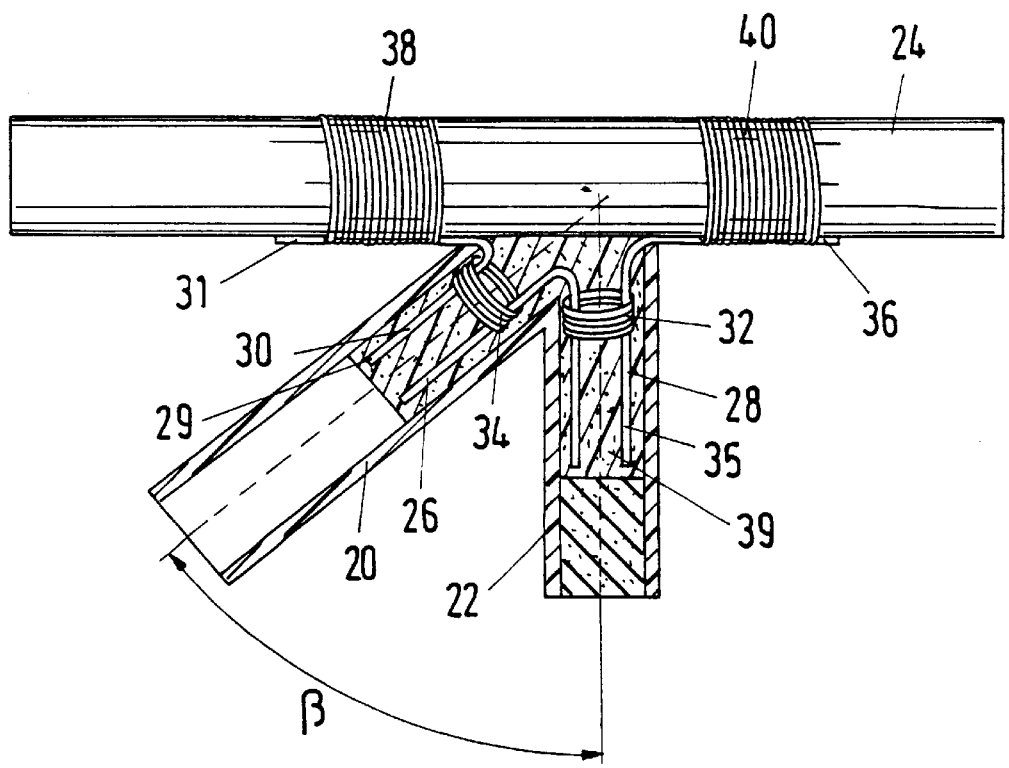
FIG. 2 is a partial axial section of the attachment of a transverse rod and diagonal rod to a continuous boom.

FIG. 2 shows an arrangement in which a diagonal rod 20 and a transverse rod 22 are to be attached to a continuous beam or boom 24. The foam core 10 is cleared out at the respective rod end in the case of the two rods 20, 22 to be attached. The rod ends are cut according to the geometric penetration parameters. The connection between the rods 20, 22 is produced via an internal angular connecting element 26 which encloses an acute angle β here. The two external angular connecting elements 28, 30 rest with one arm 35, 29 within the rod ends and with the other arm 36, 31 outside the rod ends parallel to the wall of the boom 24. Within the rods 20, 22 to be attached there are arranged respective helical windings 32, 34 which surround the arms of the angular connecting elements 26, 28 or 26, 30 engaging in the respective rod in the region of the vertices. In this respect, the design is similar to that described above with reference to FIG. 1 so reference can also be made to the description of FIG. 1 in this respect. The external arms 31, 36 rest externally against the surface of the straight boom 24 and are attached to it. Helical windings 38, 40 made of high-strength fibres which are embedded in a synthetic resin matrix 39 are provided in the region of contact of the arms 31, 36.

As can easily be seen, a further diagonal rod can also be attached to the right of the transverse rod 22 by the described principle in the design according to FIG. 2. An arrangement with two diagonal rods without the transverse rod is similarly possible, but also the connection of only one transverse rod or diagonal rod.

The attachments and connections according to FIGS. 1 and 2 are distinguished by extremely high strength.

For security, the angular connecting elements should have a maximum width transversely to the longitudinal dimension of the arms in the vertex region. The helical windings are to extend as far as possible rectilinearly over the angular connecting elements between the deflections in order to prevent stretching under load due to yielding of the support carrying the winding. The above-mentioned connecting pieces can optionally consist of flat plates on whose edges the angular connecting elements rest with their arms and round which the helical windings can then be wound. Connecting pieces designed in this way can then be embedded in an adhesive composition which is filled with mini glass beads to minimise the weight.

Figure 3:
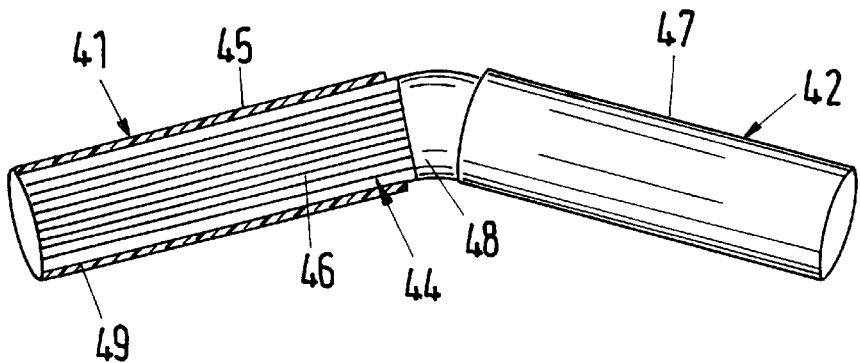
FIG. 3 shows a terminal connection between two rods abutting against one another terminally at an angle.

In the embodiment according to FIG. 3, two rods 41, 42 of which the axes intersect at an angle are to be connected to one another. Such connections are required, in particular, in three-dimensional frameworks with a triangular cross section in which the booms have to be brought at the ends onto a central connecting element with which the girder has to be attached to a common connecting element, for example by other girders. With such attachments, the axial forces from the straight continuous booms have to be conveyed into the angled rod portions without the risk of kinking.

For this purpose, an angular fitting 44 which can consist, for example, of a pressure-resistant foam is provided in the embodiment. Unidirectional fibres 46 extending over the length of the fitting are arranged over the periphery of the fitting. These unidirectional fibres can be distributed uniformly over the periphery. However, it is also possible to distribute them according to the respective load, for example to arrange more fibres on the exterior of the angular fitting than on the faces located at the top or bottom in the plane of the drawing.

To prevent kinking of the unidirectional fibres, a peripheral winding 48 of high-strength fibres is provided in the region of the vertex and is arranged in the vertex region in the drawing but can also extend over a portion of the straight arm 45, 47 of the fitting. The unidirectional fibres and the peripheral winding are then again embedded in a resin matrix and in thin pipes 41, 42. The angular fitting 44 prepared in this way is inserted in ends of rods or pipes not shown. The length of the pipes 41, 42 preferably corresponds to the depth of insertion within the rods or pipes.

Figure 4:
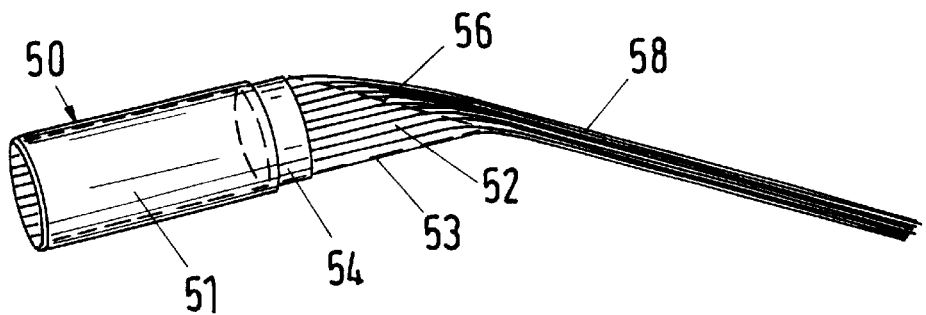
FIG. 4 shows a connection between a rod to be attached to a continuous rod.

FIG. 4 shows a further method of designing a connection for the attachment of a rod 50 to a continuous rod which is not shown in the drawing and can also be, for example, a pipe with a relatively great diameter in comparison with the rod 50.

The connection contains a fitting 52 here which is illustrated by broken peripheral lines. The fitting is round and is cut off at its end at an angle γ corresponding to the angle at which the rod 50 is to be attached to the continuous rod. Unidirectional fibres 53 which are surrounded by a helical winding 54 directly attached to the start of the oblique face 56 of the fitting 52 are again distributed round the fitting 52 in a manner dependent on the loading of the connection.

The unidirectional fibres 53 are brought together over the end face 56 of the fitting 52 so they form a flat trough 58 with a radius transversely to its longitudinal dimension which corresponds to the radius of the external diameter of the continuous pipe. This trough can decrease in width from the oblique end of the fitting, i.e. the angle of wrap of the trough and therefore its rigidity to bending can be selected such that it is greatest in the direct attachment region. The fitting 52 is also inserted into the end of the rod 50 and stuck therein once the foam core has been cleared out over this region. The end of the thin-walled pipe 51 of the rod 50 made, in particular, of composite carbon fibre material (CFK) with a ±45° orientation is cut off at an angle γ essentially to ensure an attachment at the periphery of the continuous rod not shown.

To produce the connection to the continuous rod, a helical winding which is embedded in a matrix is applied over the region of the trough 58 around the trough 58 and the continuous rod.

Figure 5:
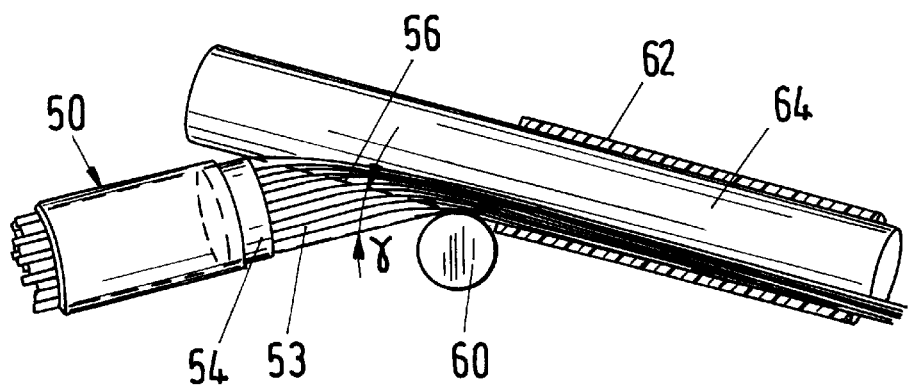
FIG. 5 shows a method of producing a connecting element according to FIG. 4.

FIG. 5 shows a method of producing the trough 58. The fitting 52 is deflected into a shaped pipe 62 over a round element 60 in the region of a tip of the chaped pipe 62. Actual shaping is carried out via a rod-shaped shaped part 64 with which the unidirectional fibres 53 are pressed in an orderly manner against the interior of the shaped pipe 62. The shaped pipe 62 and the shaped rod 64 consist of a material which cannot be wetted by the resin and are provided with an unwettable finish in each case on their surfaces.

Figure 6:
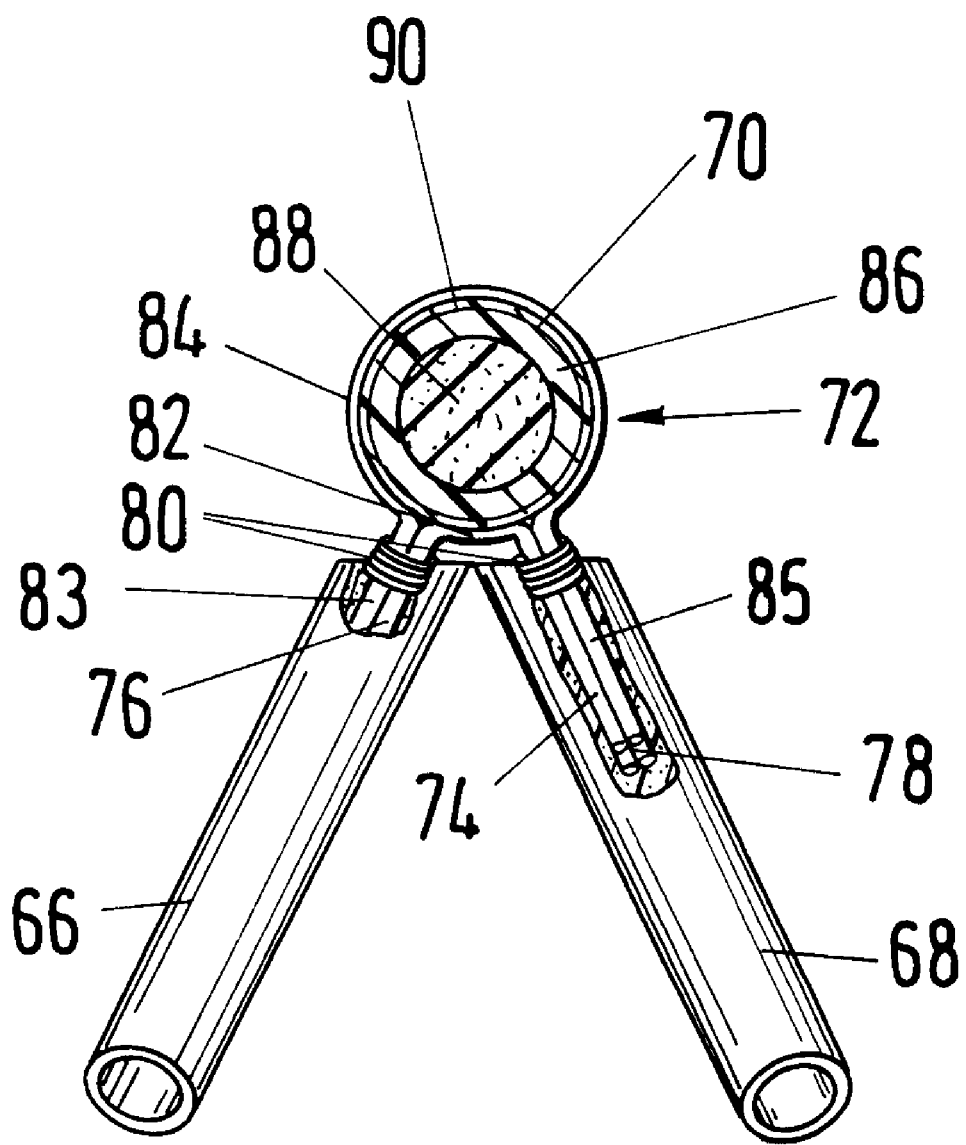
FIG. 6 shows a further embodiment of a connection according to the invention for at least three rods.

FIG. 6 is a partially cut away plan view of a further embodiment of a connection between composite fibre rods. Two rods 66, 68 arranged at an angle to one another are connected to a continuous rod or boom 70. The connection is produced by an angle fitting 72. The angle fitting 72 positively surrounds the boom 70. It engages frictionally in the two rods 66, 68.

The angle fitting 72 has an internal angular connecting element 74. The internal angular connecting element 74 is provided with two arms 76, 78. A portion 82 resting on the boom 70 is provided between the two arms. The angle fitting 72 also has an external angular connecting element 84. This connecting element 84 positively surrounds the boom 70 provided with an outer wall 86 and a foam core 88 over a broad region. The external angular connecting element 84 is also provided with two arms 83, 85. The arms of the two connecting elements 74 and 84 are provided with helical windings 80 of high-strength fibres, in particular carbon fibres, in their vertex regions.

Both the internal angular connecting element 74 and the external angular connecting element 84 are preferably produced from unidirectional fibres. They can be held together selectively as a bundle by fabric tubes made of carbon fibres.

Figure 7:
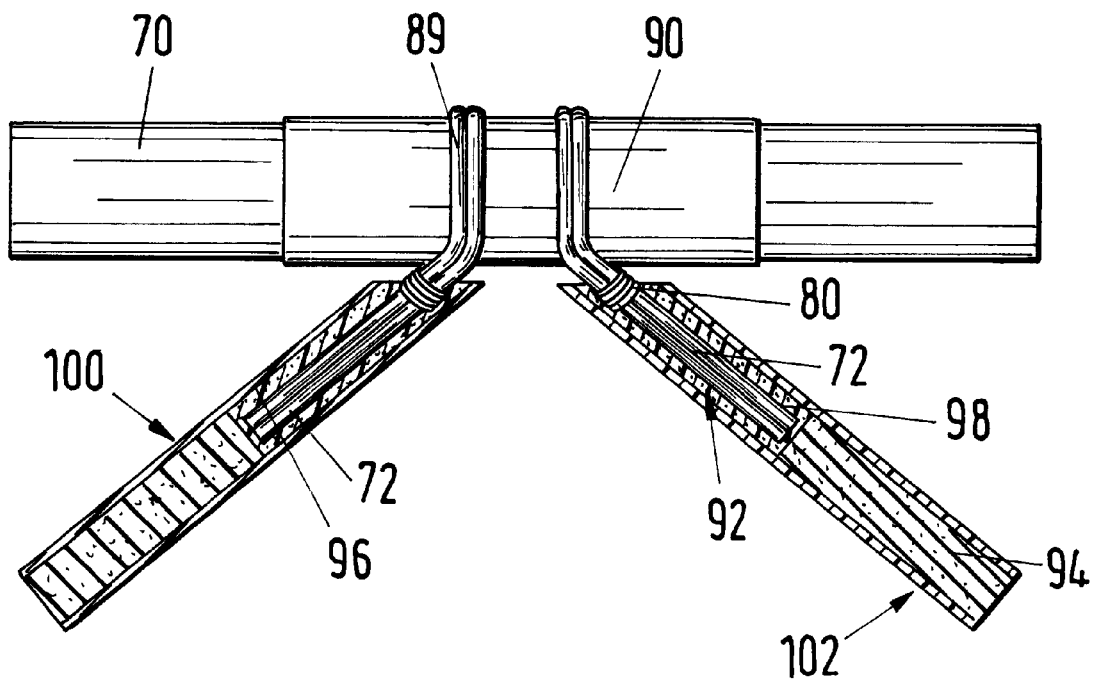
FIG. 7 is a side view of a continuous rod with further rods attached by connections according to FIG. 6.

FIG. 7 is a side view of the connection between rods, one rod being a boom 70, using angle fittings 72 according to FIG. 6.

Two angle fittings 72 with attached rods 100, 102 are shown in FIG. 7. The rods 100, 102 are mitre-cut in the attachment region for better attachment to the boom 70. The rods are preferably arranged at an angle of 45° to the boom 70. The two rods 100, 102 are therefore arranged at an angle of 90° to one another.

Boom 70 and rods 100, 102 are connected in that the preferably prefabricated angle fittings 72 are pushed onto the boom 70 in a mirror image to one another with their eye-shaped orifice 89. The arms 76, 83, 78, 85 connected by the helical windings 80 are inserted into respective cavities 92 within the rods 100, 102. The cavities are created by clearing out the foam core 94 and leaving the respective wall 96 of the rods. After insertion of the arms into the cavities 92, the cavities 92 are filled with an adhesive composition or synthetic resin filling 98. Filling is preferably carried out by injection of the corresponding adhesive composition or synthetic resin filling.

The angle fittings 72 with their eye-shaped orifices 89 are therefore secured against axial displacement on the boom 70 in that sleeve elements 90 are applied and attached in addition to the eye-shaped orifices 89.

In FIG. 7, three sleeve elements 90 are applied to the wall 86 of the boom 70. One respective sleeve element 90 is provided externally and one centrally between the two angle fittings 72. The width of the central internal sleeve element is selected such that the centre lines of the rods meet at a point. Kinking moments are therefore advantageously avoided.

Sleeve elements with a film hinge made, in particular, of glass fibres are particularly preferably used to allow reproducible adhesion of the sleeve elements on the boom. These can be folded apart as they have a pitch, can be provided with adhesive and can then be stuck to the wall 86 of the boom 70 at the appropriate points. The sleeve elements are preferably produced from composite carbon fibre material.

Figure 8:
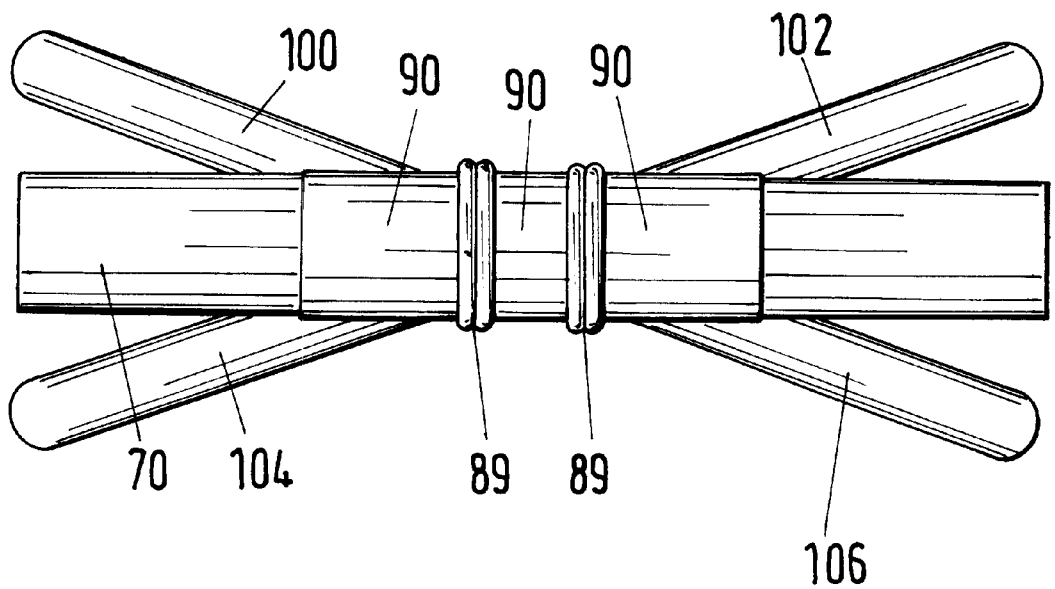
FIG. 8 is a plan view of the continuous rod with attached rods according to FIG. 7.

FIG. 8 is a plan view of a junction of a boom 70 and diagonal/transverse rods 100, 102, 104, 106 branching therefrom, created by the connection according to FIGS. 6 and 7. The respective diagonal or transverse rods are at angles, in particular, of 60° to one another as triangular truss beams and therefore preferably form equilateral triangles. Particularly good introduction of force into the rods from the boom or conversely from the attached rods into the boom can therefore be created.

It will be understood that the above description of the present invention is susceptible to various modifications, changes and adaptations.

| List of reference numerals | |
|---|---|
| 2 | rod |
| 4 | rod |
| 6 | rod |
| 8 | point |
| 10 | pressure-resistant foam core |
| 12 | wall |
| 14 | angular connecting elements |
| 15 | synthetic resin matrix |
| 16 | vertex |
| 18 | helical windings |
| 20 | diagonal rod |
| 22 | transverse rod |
| 24 | beam/boom |
| 26 | internal angular connecting element |
| 28 | external angular connecting element |
| 29 | arm |
| 30 | external angular connecting element |
| 31 | arm |
| 32 | helical winding |
| 34 | helical winding |
| 35 | arm |
| 36 | arm |
| 38 | helical winding |
| 40 | helical winding |
| 41 | rod |
| 42 | rod |
| 44 | angular fitting |
| 45 | arm |
| 46 | unidirectional fibers |
| 47 | arm |
| 48 | peripheral winding |
| 49 | fabric tube |
| 50 | rod |
| 51 | pipe |
| 52 | fitting |
| 53 | unidirectional fibers |
| 54 | helical winding |
| 56 | oblique face |
| 58 | flat trough |
| 60 | round element |
| 62 | shaped pipe |
| 64 | rod-shaped shaped part, shaped rod |
| 66 | rod |
| 68 | rod |
| 70 | rod/boom |
| 72 | angle fitting |
| 74 | internal angular connecting element |
| 76 | arm |
| 78 | arm |
| 80 | helical winding |
| 82 | resting portion |
| 83 | arm |
| 84 | external angular element |
| 85 | arm |
| 86 | wall |
| 88 | foam core |
| 89 | eye-shaped orifice |
| 90 | sleeve element |
| 92 | cavity |
| 94 | foam core |
| 96 | wall |
| 98 | synthetic resin filling/adhesive composition |
| 100 | rod |
| 102 | rod |
| 104 | rod |
| 106 | rod |

What is claimed is:

1. A connection arrangement comprising at least two round composite fiber rods to be connected and positioned at an angle to one another, angular connecting elements with an angled portion having an angle corresponding to the angle between said rods to be connected, fiber helical windings proximate the angled portion of said angular connecting elements, the rods having ends with cavities being formed at said rod ends, wherein fillers are provided for filling said cavities, respective arms of said angular connecting elements being inserted in said ends, wherein said angular connecting elements are supported in said rod ends by frictional contact and wherein said fiber helical windings are wrapped around and interconnect said angular connecting elements proximate said angled portions.

2. The connection arrangement according to claim 1, wherein said angular connecting elements are pre-assembled as a fitting to be inserted into said rod ends.

3. The connection arrangement according to claim 1, said angular connecting elements being attachable to a continuous rod, wherein external arms of said angular connecting elements project beyond said rod ends, said external arms being constructed and arranged to lie parallel to said continuous rod, said external arms being attached to said continuous rod by a helical winding embedded in a resin matrix.

4. The connection arrangement according to claim 3, wherein said angled portion of said connecting elements connecting said at least two rods being spaced from a wall of said continuous rod, said connecting elements having said external arms attached to a surface of said continuous rod.

5. A connection arrangement comprising at least one rod attached to a continuous rod, at least two connecting elements, each said connecting element having an internal arm which is inserted in an end of said at least one rod, and an external arm which extends beyond the end of said at least one rod, each said internal arm being connected to its corresponding external arm by an angled portion, said connecting elements further comprising fiber helical windings which are wrapped around and interconnect the connecting elements proximate the angled portions, said internal arms being supported in the end of said at least one rod by frictional contact, and said external arms being constructed and arranged to lie parallel to said continuous rod, said external arms being attached to said continuous rod by a helical winding.

* * * * *